(12) United States Patent
Hu

(10) Patent No.: US 12,129,401 B2
(45) Date of Patent: Oct. 29, 2024

(54) CRACKS-CONTROLLABLE COATING AND PREPARATION METHOD THEREOF

(71) Applicant: Bauhinia Coatings Manufacturing (Shanghai) Co., LTD., Shanghai (CN)

(72) Inventor: Zihe Hu, Shanghai (CN)

(73) Assignee: Bauhinia Coatings Manufacturing (Shanghai) Co., LTD., Shanghai (CN)

( * ) Notice: Subject to any disclaimer, the term of this patent is extended or adjusted under 35 U.S.C. 154(b) by 0 days.

(21) Appl. No.: 18/535,890

(22) Filed: Dec. 11, 2023

(65) Prior Publication Data
US 2024/0287327 A1   Aug. 29, 2024

(30) Foreign Application Priority Data
Dec. 15, 2022  (CN) .......................... 202211613011.8

(51) Int. Cl.
C09D 5/28    (2006.01)
C09D 5/00    (2006.01)
C09D 175/04  (2006.01)

(52) U.S. Cl.
CPC ............... C09D 5/28 (2013.01); C09D 5/002 (2013.01); C09D 175/04 (2013.01)

(58) Field of Classification Search
CPC ......... C09D 5/28; C09D 5/002; C09D 175/04
See application file for complete search history.

(56) References Cited

U.S. PATENT DOCUMENTS

2003/0035896 A1   2/2003  Willis
2007/0298179 A1  12/2007  Konig
2011/0154701 A1   6/2011  Ohori

FOREIGN PATENT DOCUMENTS

| | | |
|---|---|---|
| CN | 101339764 A | 1/2009 |
| CN | 101468581 A | 7/2009 |
| CN | 104260503 A | 1/2015 |
| CN | 104438018 A | 3/2015 |
| CN | 104804629 A | 7/2015 |
| CN | 111992469 A | 11/2020 |
| CN | 112371466 A | 2/2021 |
| JP | 2000000516 A | 1/2000 |
| JP | 2006088500 A | 4/2006 |
| WO | 2022179358 A1 | 9/2022 |

OTHER PUBLICATIONS

English abstract of CN-106116695-A.*

* cited by examiner

*Primary Examiner* — Robert S Walters, Jr.

(57) ABSTRACT

A method of preparing a crack-controllable coating layer includes the following steps. (1) A colored reaction-curable primer is sprayed on a substrate, and dried to form a first primer layer. (2) A white one-component crackle coating is sprayed on the first primer layer, and dried to form a first crackle coating layer. (3) One or two coats of a transparent reaction-curable primer are sprayed on the first crackle coating layer and dried to form a second primer layer. (4) A transparent one-component crackle coating is sprayed, and dried to form a second crackle coating layer. (5) A colorant is spread on a surface of the second crackle coating layer to fill a crack in the second crackle coating layer, and the excess colorant is wiped, and then the second crackle coating layer is dried. A polyurethane varnish is sprayed and dried to obtain the crack-controllable coating layer.

10 Claims, 3 Drawing Sheets

CRACKS-CONTROLLABLE COATING AND PREPARATION METHOD THEREOF

CROSS-REFERENCE TO RELATED APPLICATIONS

This application claims the benefit of priority from Chinese Patent Application No. 202211613011.8, filed on Dec. 15, 2022. The content of the aforementioned application, including any intervening amendments thereto, is incorporated herein by reference in its entirety.

TECHNICAL FIELD

This application relates to coatings, and more particularly to a crack-controllable coating and a preparation method thereof.

BACKGROUND

"Ge kiln" is mainly characterized by cracking in the porcelain glaze, namely, the formation of large or small crackles during the cooling stage following the baking process due to the difference between thermal expansion and contraction properties of body and glaze.

Among the Ge kiln porcelains, the products with a "golden thread and iron wire" effect are considered as precious, that is, the large darkish crackles such as ice crackles (e.g., "iron wire") are interspersed with fine and lighter crackles such as fish seed grain (e.g., "golden thread"), presenting a staggered three-dimensional beauty.

It has not been reported about the use of coating technology to achieve the "golden thread and iron wire" effect similar to Ge kiln porcelain.

Chinese patent publication No. 104260503A discloses a modified low-quality poplar wood furniture with a special coating and a painting method. The furniture includes a modified low-quality poplar wood substrate and a multi-layer coating thereon. The multi-layer coating consists of a sealing primer layer, a polyurethane (PU) yellow primer layer, a partial ash filling layer, a PU white primer layer, a white crackle lacquer layer, and a glaze coating, a nitro varnish layer stacked sequentially from bottom to top. The painting method includes the following steps: 1) treatment of white body; 2) application of a sealing primer; 3) primary sanding; 4) application of the first primer; 5) secondary sanding; 6) water-borne putty filling; 7) application of the second primer; 8) digging water-borne putty and sanding; 9) spraying of the crackle lacquer; 10) application of the antique lacquer; and 11) painting of the topcoat. The disclosed method broadens the application of modified low-quality materials in the surface decoration of solid wood furniture, but the crack level and effect are far inferior to that of Ge kiln porcelains.

Chinese patent publication No. 112371466A discloses a preparation method of a three-dimensional crackle coating, a three-dimensional crackle coating, a lamp accessory, and a lamp. The preparation method includes: painting a primer on a substrate; drying the primer; painting a topcoat on the primer, with a shrinkage ratio of the primer to the topcoat being greater than or equal to 200; and drying the topcoat to obtain a three-dimensional crackle coating on the substrate. Based on the different shrinkage rates of the primer and the topcoat, w the topcoat cracks to form natural crackle textures of different shapes after drying, thereby obtaining the three-dimensional crackle coating. The coating prepared by such method has natural and diverse textures, good three-dimensional effect, and strong texture. However, the large cracks are too coarse with irregular crack edges, and fine paint fragments are remained in the cracks (i.e., "island" phenomenon). Moreover, the small cracks are relatively short with unclear crack edges. Therefore, the cracking effect is far inferior to the "golden thread and iron wire" effect of Ge kiln porcelains.

In order to prepare the Ge kiln porcelains with the "golden thread and iron wire" effect, it is required to perform sintering at least twice at a temperature more than 1,000° C. to form uniform large cracks and fine cracks, which has a complicated process and high energy consumption. Moreover, the body is only limited to ceramics. If it is required to present the "golden thread and iron wire" effect on the surfaces of bamboo and wood furniture/crafts, concrete walls, metal components while avoiding the above shortcomings, it is necessary to develop a crack-controllable coating suitable for room-temperature drying and a preparation process thereof.

In summary, it is important to develop a preparation method of the crack-controllable coating applicable to various substrates.

SUMMARY

In view of the deficiencies in the prior art, this application provides a crack-controllable coating and a preparation method thereof. The crackle coating prepared herein can exhibit an effect similar to the "golden thread and iron wire" effect of the Ge kiln porcelains on a variety of substrates.

Technical solutions of this application are described as follows.

In a first aspect, this application provides a method for preparing a crack-controllable coating, comprising:
  (1) spraying at least one coat (e.g., one coat for one cross, two coats for two crosses, three coats for three crosses, four coats for four crosses) of a colored reaction-curable primer on a substrate followed by drying to form a first primer layer;
  (2) spraying a first one-component crackle coating on the first primer layer followed by drying to form a first crackle coating layer;
  (3) spraying one or two coats (e.g., one coat for one cross, two coats for two crosses) of a transparent reaction-curable primer on the first crackle coating layer followed by drying to form a second primer layer;
  (4) spraying a second one-component crackle coating on the second primer layer followed by drying to form a second crackle coating layer, wherein the second one-component crackle coating is transparent; and
  (5) spreading a colorant on a surface of the second crackle coating layer to allow the colorant to be embedded in a crack in the second crackle coating layer; wiping the second crackle coating layer to remove excess colorant followed by drying; and spraying a polyurethane varnish on the second crackle coating layer followed by drying to obtain the crack-controllable coating.

In this application, the crack-controllable coating has the same "golden thread and iron wire" effect as a Ge kiln porcelain.

In an embodiment, the step (1) further comprises testing a surface drying time and a hard drying time of the colored reaction-curable primer.

In an embodiment, the surface drying time is tested in accordance with method B of GB/T 1728-2020 surface drying time; and the hard drying time is tested in accordance with method A of GB/T 1728-2020 hard drying time.

In an embodiment, in the step (1), the drying is performed at 5-35° C., for example 10° C., 15° C., 20° C., 25° C., or 30° C.

In an embodiment, the drying is performed at the humidity of 30%-75%, for example 35%, 40%, 45%, 50%, 55%, 60%, 65%, or 70%.

In an embodiment, the drying time is 1.5-2.5 times of the surface drying time, such as 1.6 times, 1.7 times, 1.8 times, 1.9 times, 2.0 times, 2.1 times, 2.2 times, 2.3 times, and 2.4 times, preferably 2 times.

In an embodiment, the drying time is 35%-45% of the hard drying time, such as 36%, 37%, 38%, 39%, 40%, 41%, 42%, 43% and 44%, preferably 40%.

In this application, the drying time of the colored reaction-curable primer is controlled within the certain range which is the window period for producing controllable cracks. If the drying time is too short, which will cause the cracking of the latter cracking paint to be too coarse and the cracks not fine enough. If the drying time is too long, which will cause the cracking of the latter cracking paint to be insufficiently or unable to be cracked.

In an embodiment, in the step (1), the colored reaction-curable primer comprises a black reaction-curable primer, which in addition to black may also be grey, dark brown, or tan.

In an embodiment, the black reaction-curable primer is selected from the group consisting of a black two-component polyurethane primer, a black one-component moisture-curable polyurethane primer, a black one-component alkyd enamel, a black two-component epoxy primer and a combination thereof. Preferably, the black reaction-curable primer is selected from the group consisting of the black two-component polyurethane primer, the black one-component alkyd enamel, or the black two-component epoxy primer and a combination thereof. The curing reactions of the primers are mild and favorable for controlling cracking of the later crackling primer. Conversely, the more violently-reactive two-component unsaturated polyester primers and UV-curing primers are not suitable, as the coating film has a more violent shrinkage before hard drying resulting in the upper crackling coating layer unable to realize controlled cracking.

In an embodiment, the substrate is made of at least one of a bamboo wood, a concrete, or a metal. Preferably, the substrate is made of a combination of bamboo wood and concrete, a combination of concrete and metal, a combination of bamboo wood, concrete, and metal. The primers should be different for different substrates, for example, the polyurethane primer may be preferred for bamboo wood, and the epoxy primer may be preferred for concrete and metal.

In an embodiment, in the step (2), a spraying amount of the first colored one-component crackle coating is 6-8 $m^2/kg$, such as 6.2 $m^2/kg$, 6.4 $m^2/kg$, 6.6 $m^2/kg$, 6.8 $m^2/kg$, 7.0 $m^2/kg$, 7.2 $m^2/kg$, 7.4 $m^2/kg$, 7.6 $m^2/kg$, or 7.8 $m^2/kg$.

In this application, the first colored one-component crackle coating is in the range of 6-8 $m^2/kg$, which is easy to form the appropriate "ice crack" plate crackles. If the spraying amount is too high, the formed crackles are too large, too coarse, and unattractive. If the spraying amount is too low, the finely crackles will be formed, which does not have the "iron wire" effect.

In an embodiment, the thickness of the first crackle coating layer is 30-40 μm, such as, 32 μm, 34 μm, 36 μm, or 38 μm.

In this application, the thickness of the first crackle coating layer is 30-40 μm, which is easy to form a suitable "ice crack" plate crackles. If the thickness is too large, the formed crackles are too large, too coarse, and unattractive. If the thickness is too small, the finely crackles will be formed, which does not have the "iron wire" effect.

In an embodiment, in the step (2), the drying is performed to allow hard drying of the first one-component crackle coating.

In an embodiment, the first crackle coating layer is presented in ice crackles with a width of 0.3-0.8 mm, for example 0.4 mm, 0.5 mm, 0.6 mm, or 0.7 mm.

In an embodiment, a crack of the first crackle coating layer presents the color of the first primer layer.

In an embodiment, the first one-component crackle coating comprises a white one-component crackle coating, which in addition to white may also be light greyish white, light green, or light pink.

In an embodiment, the white one-component crackle coating is a white nitro crackle lacquer, a white acrylic crackle lacquer, or a combination thereof.

In an embodiment, the step (3) further comprises testing a surface drying time and a hard drying time of the transparent reaction-curable primers.

In this application, the surface drying time is tested in accordance with the B method of GB/T 1728-2020 surface drying time; and the hard drying time is tested in accordance with the A method of GB/T 1728-2020 actual drying time.

In an embodiment, in the step (3), the drying is performed at 5-35° C., for example 10° C., 15° C., 20° C., 25° C., or 30° C.

In an embodiment, the drying is performed at a humidity of 30%-75% for example 35%, 40%, 45%, 50%, 55%, 60%, 65%, or 70%.

In an embodiment, the drying time is 1.5-2.5 times of the surface drying time of the transparent reaction-curable primer, for example 1.6 times, 1.7 times, 1.8 times, 1.9 times, 2.0 times, 2.1 times, 2.2 times, 2.3 times, 2.4 times, preferably 2 times.

In an embodiment, the drying time is 35%-45% of the hard drying time of the transparent reaction-curable primer, for example 36%, 37%, 38%, 39%, 40%, 41%, 42%, 43%, 44%, preferably 40%.

In this application, the drying time of the transparent reaction-curable primer is controlled within the certain range which is the window period for producing controllable cracks. If the drying time is too short, which will cause the cracking of the latter cracking paint to be too coarse and the cracks not fine enough. If the drying time is too long, which will cause the cracking of the latter cracking paint to be insufficiently or unable to be cracked.

In an embodiment, in the step (3), the transparent reaction-curable primer is selected from the group consisting of a transparent two-component polyurethane primer, a transparent one-component moisture-curable polyurethane primer, a transparent one-component alkyd primer, a transparent two-component epoxy primer, and a combination thereof. Preferably, the transparent reaction-curable primer comprises the transparent two-component polyurethane primer, the transparent one-component alkyd primer, or the transparent two-component epoxy primer, and a combination thereof. The curing reactions of the primers are mild and favorable for controlling cracking of the later crackling primer. Conversely, the more violently-reactive transparent two-component unsaturated polyester primers and transparent UV-curing primers are not suitable, as the coating film has a more violent shrinkage before hard drying resulting in the upper crackling coating layer unable to realize controlled cracking.

In an embodiment, in the step (4), a spraying amount of the second one-component crackle coating is 12-15 m²/kg, such as 12.5 m²/kg, 13 m²/kg, 13.5 m²/kg, 14 m²/kg, or 14.5 m²/kg.

In this application, the spraying amount of the second one-component crackle coating is in the range of 12-15 m²/kg, which is easy to form the appropriate "fish seed crack" plate crackles. If the spraying amount is too low, the formed crackles are too fine, and unattractive. If the spraying amount is too high, the crackles will be too large and too coarse, which does not have the "golden thread" effect.

In an embodiment, the thickness of the second crackle coating layer is 15-25 μm, such as 16 μm, 18 μm, 20 μm, 22 μm, 24 μm, or 25 μm.

In this application, the thickness of the second crack coating is 15-25 μm, which is easy to form the appropriate "fish seed crack" plate crackles. If the spraying amount is too low, the formed crackles are too fine, and unattractive. If the spraying amount is too high, the crackles will be too large and too coarse, which does not have the "golden thread" effect.

In an embodiment, in the step (4), the drying is performed to allow hard drying of the second one-component crackle coating.

In an embodiment, the second crackle coating layer is presented in fish seed crackles with a width of 0.05-0.2 mm, for example 0.06 mm, 0.08 mm, 0.10 mm, 0.12 mm, 0.14 mm, 0.16 mm, or 0.18 mm.

In an embodiment, the second one-component crackle coating comprises a transparent one-component crackle coating, and the transparent one-component crackle coating is a transparent nitro crackle lacquer, a transparent acrylic crackle coating or a combination thereof.

In an embodiment, the colorant in the step (5) comprises a yellow colorant.

In an embodiment, the yellow colorant is a yellow oily metal complex dye, a yellow iron oxide Anba glaze or a combination thereof.

In an embodiment, the polyurethane varnish comprises a two-component polyurethane varnish.

In an embodiment, the preparation method includes the following steps:
(1) spraying at least one layer of the black reaction-curable two-component polyurethane primer on the substrate, and drying for 1.5-2.5 times of the surface drying time to 35%-45% of the hard drying time to form the first primer layer;
(2) spraying the white one-component crackle coating on the first primer layer with the spraying amount of 6-8 m²/kg; and the drying is performed to allow hard drying of the white one-component crackle coating, so as to form the first crackle coating layer with the thickness of 30-40 μm; wherein the first crackle coating layer is presented in ice crackles with a width of 0.3-0.8 mm, and the crack of the first crackle coating layer present black;
(3) spraying one to two coats of the transparent reaction-curable two-component polyurethane primer; and drying for 1.5-2.5 times of the second surface drying time to 35%-45% of the second hard drying time, so as to form the second primer layer;
(4) spraying the transparent one-component crackle coating on the second primer layer with the spraying amount of 12-15 m²/kg; and performing the drying to allow hard drying of the transparent one-component crackle coating, so as to form the second crackle coating layer with the thickness of 15-25 μm; wherein the second crackle coating layer is presented in fish seed crackles with a width of 0.05-0.2 mm; and
(5) wiping the surface of the second crackle coating layer with the yellow colorant, and filling the yellow colorant in the cracks of the second crackle coating layer; wiping the excess yellow colorant from the non-cracked surface of the second crackle coating layer; spraying the polyurethane varnish after drying, and performing the drying to allow hard drying of the polyurethane varnish, so as to obtain the crack-controllable coating.

In a second aspect, this application provides a crack-controllable coating which is prepared by the above method, and the crack-controllable coating has the same "golden thread and iron wire" effect as a Ge kiln porcelain.

Compared with the prior art, this application has the following beneficial effects.

The method facilitates the formation of crack-controllable coatings, and the prepared crackle coatings can exhibit an effect similar to the "golden thread and iron wire" effect of the Ge kiln products on various substrates. The coating can be used to replace the enamel in the fabrication of imitation Ge kiln porcelains and handicrafts after the pottery billet is fired, thereby avoiding the high temperature sintering. The coating can be applied to the wood furniture, iron products and wall surface to offer the imitation Ge kiln artistic effect.

DETAILED DESCRIPTION OF EMBODIMENTS

Embodiments are described below to facilitate the understanding of the present disclosure and not intended to limit the disclosure.

Example 1

Figure 2:
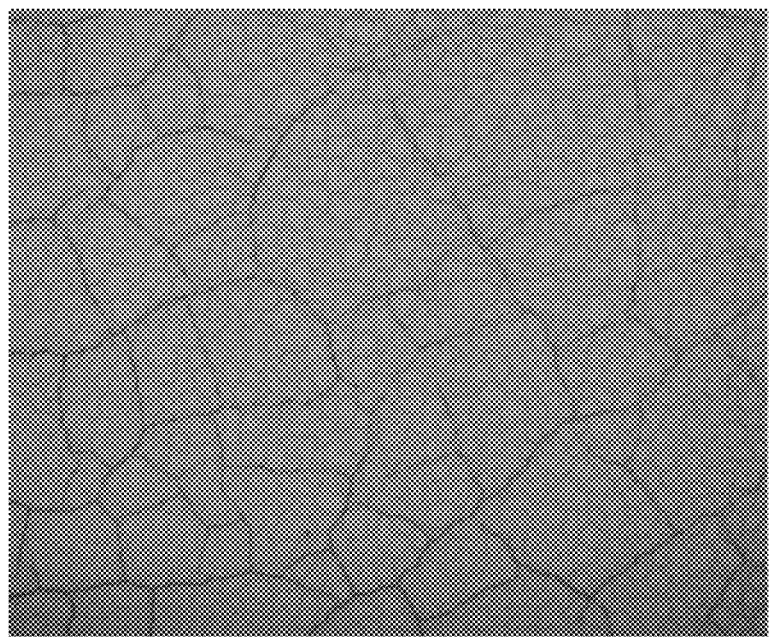
FIG. 2 is a schematic diagram of a morphology of a crack-controllable coating obtained in Example 1 of the present disclosure.

This example provides a crack-controllable coating, the morphology of which is schematically shown in FIG. 2. The crack-controllable coating is prepared by the following steps.

(1) Black odorless polyurethane primer was sprayed on the surface of treated wood furniture and dried. The surface drying time of the polyurethane primer was 13 minutes, and the hard drying time was 2.5 h. The polyurethane primer was self-dried at 25° C. and a humidity of 55% for 30 minutes to form a first primer layer. The black odorless polyurethane primer was purchased from Bauhinia Coatings Manufacturing (Shanghai) Co., Ltd, and product model: ZJP4310-10398N.

(2) According to a spraying amount of 7 m²/kg with an error within 0.5 m²/kg, and white nitro crackle lacquer was sprayed on the first primer layer. After tens of seconds, there were large cracks with the average width of 0.7 mm, and width fluctuations were in the range of 0.05 mm. The cracks were black. After 12 hours of hard drying, the first crackle coating layer was formed. The white nitro crackle lacquer was purchased from Bauhinia, and product model: 691-01A.

(3) Transparent odorless polyurethane primer was sprayed on the first crackle coating layer. The surface drying time of the transparent odorless polyurethane primer was 15 minutes, and the hard drying time was 2.5 hours. The transparent odorless polyurethane primer was dried at 25° C. and a humidity of 55% for 30 minutes, so as to form a second primer layer. The transparent odorless polyurethane primer was purchased from Bauhinia, and product model: ZJP3312N.

(4) According to a spraying amount of 13 $m^2$/kg with the error within 0.5 $m^2$/kg, transparent nitro crackle varnish was sprayed on the second primer layer. After tens of seconds, there were fine cracks with the cracking width of 0.1 mm, and the width fluctuations were in the range of 0.02 mm. After 4 hours of hard drying, a second crackle coating layer was formed. The transparent nitro crackle varnish was purchased from Bauhinia, and product model: LW-99.

(5) Cotton cloth dipped in high concentration of yellow essence and wiped the surface of the second crackle coating layer. The small cracks were filled with yellow essence, and excess essence was cleaned up. Then, a high yellowing-resistant polyurethane varnish was sprayed and dried, to obtain the crack-controllable coating with the imitation effect of the kiln golden thread. The yellow essence was purchased from Bauhinia, and product model: 694-002. The high yellowing-resistant polyurethane varnish was purchased from Bauhinia, and product model: ZJP6697F7.

Example 2

A crack-controllable coating was prepared by the following method.

(1) Black moisture-curable polyurethane primer was sprayed on the surface of treated bamboo furniture. The surface drying time of the polyurethane primer was 15 minutes, and the hard drying time was 4 hours and 10 minutes. The polyurethane primer was self-dried at 25° C. and a humidity of 55% for 40 minutes to form a first primer layer. The black moisture-curable polyurethane primer was purchased from Bauhinia, and product model: D899-88.

(2) According to a spraying amount of 7.5 $m^2$/kg with an error within 0.5 $m^2$/kg, and white nitro crackle lacquer was sprayed on the first primer layer. After tens of seconds, there were large cracks with the average width of 0.6 mm, and width fluctuations were in the range of 0.05 mm. The cracks were black. After 12 hours of hard drying, the first crackle coating layer was formed. The white nitro crackle lacquer was purchased from Bauhinia, and product model: 691-01A.

(3) Moisture-curable polyurethane varnish was sprayed on the first crackle coating layer. The surface drying time of the moisture-curable polyurethane varnish was 15 minutes, and the hard drying time was 4 hours. The moisture-curable polyurethane varnish was dried at 25° C. and a humidity of 55% for 30 minutes, so as to form a second primer layer. The moisture-curable polyurethane varnish was purchased from Bauhinia, and product model: D899.

(4) According to a spraying amount of 13.5 $m^2$/kg with the error within 0.5 $m^2$/kg, transparent nitro crackle varnish was sprayed on the second primer layer. After tens of seconds, there were fine cracks with the cracking width of 0.1 mm, and the width fluctuations were in the range of 0.02 mm. After 4 hours of hard drying, a second crackle coating layer was formed. The transparent nitro crackle varnish was purchased from Bauhinia, and product model: LW-99.

(5) Cotton cloth dipped with yellow iron oxide (Glaze) was used to wipe the surface of the second crackle coating layer. The small cracks were filled with yellow iron oxide, and excess iron oxide was cleaned up. Then, a high yellowing-resistant polyurethane varnish was sprayed and dried, to obtain the crack-controllable coating with the imitation effect of the kiln golden thread. The yellow iron oxide was purchased from Bauhinia, and product model: ZJCB32A. The yellowing-resistant polyurethane varnish was purchased from Bauhinia, and product model: ZJP6697F7.

Example 3

A crack-controllable coating was prepared by the following method.

(1) Black alkyd enamel was sprayed on the surface of a treated concrete wall. The surface drying time of the black alkyd enamel was 40 minutes, and the hard drying time was 5 hours. The black alkyd enamel was self-dried at 25° C. and the humidity of 55% for 1 hour to form a first primer layer. The black alkyd enamel was purchased from Bauhinia, and product model: Zipc10T-88.

(2) According to an average spraying amount of 7.5 $m^2$/kg with an error within 0.5 $m^2$/kg, and white waterborne acrylic crackle lacquer was sprayed on the first primer layer. After tens of seconds, there were large cracks with the average width of 0.5 mm, and width fluctuations were in the range of 0.05 mm. The cracks were black. After 24 hours of hard drying, the first crackle coating layer was formed. The white waterborne acrylic crackle lacquer was purchased from Bauhinia, and product model: ZJW4320F0.

(3) Alkyd varnish was sprayed on the first crackle coating layer. The surface drying time of the alkyd varnish was 40 minutes, and the hard drying time was 5 hours. The alkyd varnish was dried at 25° C. and a humidity of 55% for 1 hour, so as to form a second primer layer. The alkyd varnish was purchased from Bauhinia, and product model: Zipc10T-99.

(4) According to a spraying amount of 14.5 $m^2$/kg with the error within 0.5 $m^2$/kg, waterborne acrylic crackle varnish was sprayed on the second primer layer. After tens of seconds, there were fine cracks with the cracking width of 0.1 mm, and the width fluctuations were in the range of 0.02 mm. After 12 hours of hard drying, a second crackle coating layer was formed. The waterborne acrylic crackle varnish was purchased from Bauhinia, and product model: ZJW4329.

(5) Cotton cloth dipped yellow iron oxide and wiped the surface of the second crackle coating layer. The small cracks were filled with yellow iron oxide, and excess iron oxide was cleaned up. Then, a high yellowing-resistant polyurethane varnish was sprayed and dried, to obtain the crack-controllable coating with the imitation effect of the kiln golden thread. The yellow iron oxide was purchased from Bauhinia Advance Materials Group (product model: ZJCB32A). The yellowing-resistant polyurethane varnish was purchased from Bauhinia, and product model: ZJP6697F7.

Example 4

A crack-controllable coating was prepared by the following method.

(1) Gray two-component epoxy primer was sprayed on the surface of a treated metal workpiece. The surface drying time of the gray two-component epoxy primer was 20 minutes, and the hard drying time was 6 hours. The gray two-component epoxy primer was self-dried at 25° C. and the humidity of 55% for 50 minutes to form a first primer layer. The gray two-component epoxy primer was purchased from Bauhinia, and product model: Zipc20P-204.

(2) According to an average spraying amount of 6.5 m²/kg with an error within 0.5 m²/kg, and white nitro crackle lacquer was sprayed on the first primer layer. After tens of seconds, there were large cracks with the average width of 0.6 mm, and width fluctuations were in the range of 0.05 mm. The cracks were black. After 12 hours of hard drying, the first crackle coating layer was formed. The white nitro crackle lacquer was purchased from Bauhinia, and product model: 691-01A.

(3) Transparent two-component epoxy primer was sprayed on the first crackle coating layer. The surface drying time of the alkyd varnish was 25 minutes, and the hard drying time was 6 hours. The transparent two-component epoxy primer was dried at 25° C. and a humidity of 55% for 50 minutes, so as to form a second primer layer. The transparent two-component epoxy primer was purchased from Bauhinia, and product model: Zipc20P-101.

(4) According to a spraying amount of 14.5 m²/kg with the error within 0.5 m²/kg, transparent nitro crackle varnish was sprayed on the second primer layer. After tens of seconds, there were fine cracks with the cracking width of 0.09 mm, and the width fluctuations were in the range of 0.02 mm. After 4 hours of hard drying, a second crackle coating layer was formed. The transparent nitro crackle varnish was purchased from Bauhinia, and product model: LW-99.

(5) Cotton cloth dipped high concentration of yellow essence and wiped the surface of the second crackle coating layer. The small cracks were filled with yellow essence, and excess essence was cleaned up. Then, a high yellowing-resistant polyurethane varnish was sprayed and dried, to obtain the crack-controllable coating with the imitation effect of the kiln golden thread. The yellow iron oxide was purchased from Bauhinia, and product model: 694-002. The yellowing-resistant polyurethane varnish was purchased from Bauhinia, and product model: ZJP6697F7.

Examples 5-8

The differences between the Examples 5-8 and Example 1 were that the self-drying time in step (1) is 26 minutes (Example 5), 1 hour (Example 6), 18 minutes (Example 7), and 1.3 hours (Example 8). The rest steps are the same as Example 1.

Comparative Example 1

The differences between the comparative example 1 and example 1 were that the white nitro crackle lacquer in step (2) was replaced with a white two-component polyurethane crackle lacquer. The white two-component polyurethane crackle lacquer was prepared according to the formulas and process of the PU crackle lacquer disclosed in the Chinese patent publication No. 102604519A.

Comparative Example 2

The differences between the comparative example 2 and example 1 were that the transparent nitro crackle varnish in step (4) was replaced with a transparent two-component polyurethane crackle varnish. The transparent two-component polyurethane crackle varnish was prepared in accordance with the PU crackle coating formula (without adding titanium dioxide and other pigments) and process disclosed in the Chinese patent publication No. 102604519A.

Performance Test

The crack-controllable coatings prepared by the methods described in Examples 1-8 and the comparative examples 1-2 were tested as follows.

In the preparation process of the crack-controllable coatings, the crack morphology of the first crackle coating layer and the crack morphology of the second crackle coating layer were observed. According to uniformity of distribution of the crack morphology and width reasonableness (in the range of 0.3-0.8 mm was preferred), crack morphology of the first crackle coating layer was classified into Grade I, Grade II, Grade III, and Grade IV. Grade I cracks were uniformly distributed with a width of 0.6-0.8 mm. Grade II cracks were uniformly distributed with a width of 0.5-0.6 mm. Grade III cracks were uniformly distributed with a width of 0.3-0.5 mm. Grade IV represents no crack distribution, and crack width of 0 mm (no cracking). The cracks of the second crackle coating layer were divided into Grade I and Grade IV, due to the fine cracks, and no longer divided into Grade II or Grade III. Grade I cracks were uniformly distributed with a width of 0.08-0.2 mm, and Grade IV represents no crack distribution, and crack width of 0 mm (no cracking).

The test results were shown in Table 1.

TABLE 1

Uniformity and width reasonability of cracks in the first and second crackle coating layers

| | Cracks of first crackle coating layer | | Cracks of second crackle coating layer | |
|---|---|---|---|---|
| | Uniformity | Width reasonability | Uniformity | Width reasonability |
| Example 1 | Grade I | Grade I | Grade I | Grade I |
| Example 2 | Grade I | Grade II | Grade I | Grade I |
| Example 3 | Grade I | Grade II | Grade I | Grade I |
| Example 4 | Grade I | Grade II | Grade I | Grade I |
| Example 5 | Grade I | Grade I | Grade I | Grade I |
| Example 6 | Grade I | Grade II | Grade I | Grade I |
| Example 7 | Grade IV | Grade IV | Grade I | Grade I |
| Example 8 | Grade IV | Grade IV | Grade I | Grade I |
| Comparative example 1 | Grade IV | Grade IV | Grade I | Grade I |
| Comparative example 2 | Grade I | Grade I | Grade IV | Grade IV |

Table 1 showed that the preparation method described in this disclosure facilitates the formation of crack-controllable coatings, more particularly to the formation of crackle coating layers which simulate the "golden thread-iron wire" ceramic crackle effect of the Ge kiln porcelain on various substrates, as shown in FIG. 2.

It can be demonstrated from the comparison between Comparative example 1 and Example 1 that the performance of Comparative example 1 was inferior to that of Example 1, indicating that replacing the one-component crackle coating with the two-component crackle coating was not conducive to the formation of the crack-controllable coating.

It can be demonstrated from the comparison between Comparative example 2 and Example 1 that the performance of Comparative example 2 was inferior to that of Example 1, indicating that replacing the one-component crackle coating with the two-component crackle coating was not conducive to the formation of the crack-controllable coating.

The test results of Examples 5-8 and Example 1 showed that the performance of Examples 7-8 was inferior to that of Examples 5-6, proving that when forming the primer layer, the drying time between 1.5-2.5 times of the surface drying time to 35%-45% of the hard drying time was more conducive to the formation of the crack-controllable coating, preferably, controlling the drying time between 2 times of the surface drying time to 40% of the hard drying time.

Figure 1A:
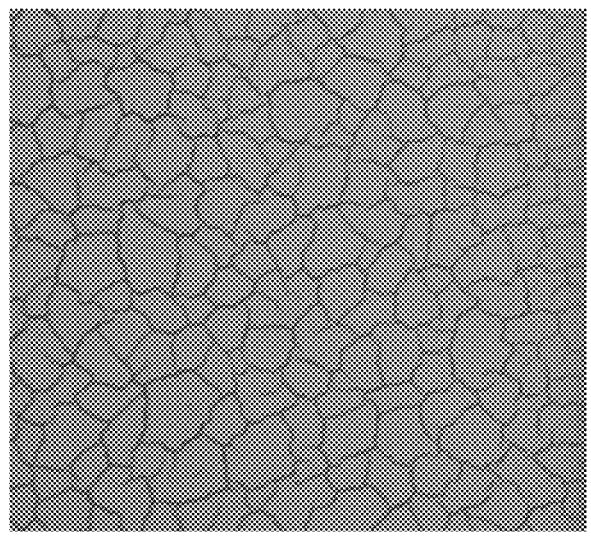
FIG. 1a is a schematic diagram of a morphology of a controllable fine crack coating according to one embodiment of the present disclosure.
Figure 1B:
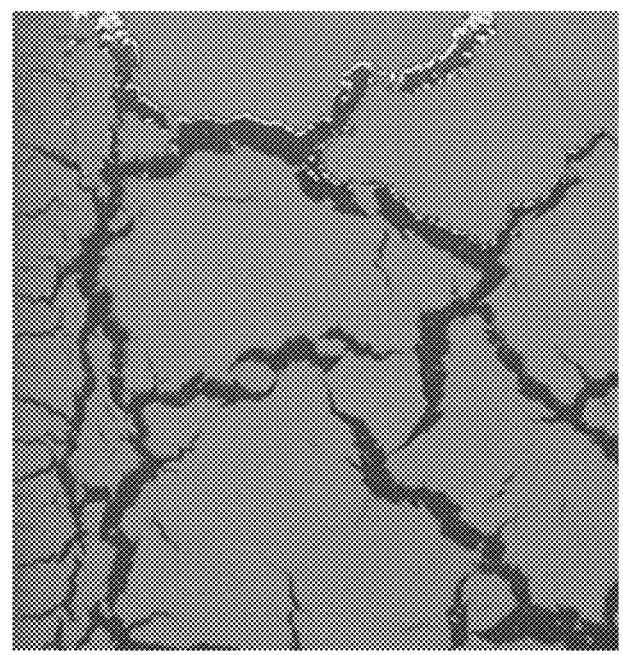
FIG. 1b is a schematic diagram of a morphology of an uncontrollable crack coating according to one embodiment of the present disclosure.

In this disclosure, the preparation method facilitates the formation of the crack-controllable coating, more particularly to crackle coating layers which simulate the "golden thread-iron wire" ceramic crackle effect of the Ge kiln porcelain on various substrates. In the step (1), the reaction curing of the reaction-curable primer, the limited and ordered semi-cured shrinkage of the coating film in the optimal time between the surface drying and the hard drying, and the limited swelling of the semi-cured coating film by the subsequent crackle primer provides a limited "crackle drift" for the subsequent crackle primer, provides the basis for the formation of controllable fine cracks, and avoids the uncontrollable cracking of the subsequent crackle primer by using other thermoplastic one-component self-drying primers, see FIGS. 1a and 1b.

In step (2), the one-component crackle coating and appropriate coating thickness can avoid uncontrolled cracking or inability to crack of two-component reaction crackle coating, and be conducive to the formation of relatively large cracks, in order to form the "iron wire" effect.

In steps (3), (4) and (5), the semi-dry cured coating film of the reaction-curable primer is obtained within the optimal time between the surface drying and the hard drying, the one-component crackle coating is thinly coated, and a colorant is used to color the fine cracks, which facilitates the formation of controllable cracks with relatively small plates, so as to form a "golden thread" effect, as shown in FIG. 2.

The technical solutions of the present disclosure are described above with reference to the embodiments of the present disclosure. It is clear that described above are merely some embodiments of the disclosure, which are not intended to limit the disclosure. It should be understood that any modifications and replacements made by those skilled in the art without departing from the spirit of the disclosure should fall within the scope of the disclosure defined by the appended claims.

What is claimed is:

1. A method of preparing a crack-controllable coating, comprising:
   (1) spraying at least one coat of a colored reaction-curable primer on a substrate followed by drying to form a first primer layer;
   (2) spraying a first one-component crackle coating on the first primer layer followed by drying to form a first crackle coating layer;
   (3) spraying one or two coats of a transparent reaction-curable primer on the first crackle coating layer followed by drying to form a second primer layer;
   (4) spraying a second one-component crackle coating on the second primer layer followed by drying to form a second crackle coating layer, wherein the second one-component crackle coating is transparent; and
   (5) spreading a colorant on a surface of the second crackle coating layer to allow the colorant to be embedded in a crack in the second crackle coating layer; wiping the second crackle coating layer to remove excess colorant followed by drying; and spraying a polyurethane varnish on the second crackle coating layer followed by drying to obtain the crack-controllable coating;

wherein in the step (2), a spraying amount of the first one-component crackle coating is 6-8 m²/kg; a thickness of the first crackle coating layer is 30-40 μm; the drying is performed to allow through drying of the first one-component crackle coating; and the first one-component crackle coating comprises a white one-component crackle coating, and the white one-component crackle coating is a white nitro crackle lacquer, a white acrylic crackle lacquer or a combination thereof;
   in the step (4), a spraying amount of the second one-component crackle coating is 12-15 m²/kg; a thickness of the second crackle coating layer is 15-25 μm; the drying is performed to allow through drying of the second one-component crackle coating; and the second one-component crackle coating comprises a transparent one-component crackle coating, and the transparent one-component crackle coating is a transparent nitro crackle lacquer, a transparent acrylic crackle coating or a combination thereof;
   the step (1) further comprises:
   testing a surface drying time and a through drying time of the colored reaction-curable primer; wherein the drying is performed at 5-35° C. and a humidity of 30%-75%, and a drying time is 1.5-2.5 times the surface drying time of the colored reaction-curable primer and 35%-45% of the through drying time of the colored reaction-curable primer; and
   the step (3) further comprises:
   testing a surface drying time and a through drying time of the transparent reaction-curable primer; wherein the drying is performed at 5-35° C. and a humidity of 30%-75%, and a drying time is 1.5-2.5 times of the surface drying time of the transparent reaction-curable primer and 35%-45% of the through drying time of the transparent reaction-curable primer.

2. The method of claim 1, wherein in the step (1), the colored reaction-curable primer comprises a black reaction-curable primer.

3. The method of claim 2, wherein the black reaction-curable primer is selected from the group consisting of a black two-component polyurethane primer, a black one-component moisture-curable polyurethane primer, a black one-component alkyd enamel, a black two-component epoxy primer and a combination thereof.

4. The method of claim 1, wherein the substrate is made of bamboo wood, concrete, metal or a combination thereof.

5. The method of claim 1, wherein the first crackle coating layer is presented in ice crackles with a width of 0.3-0.8 mm.

6. The method of claim 1, wherein a crack of the first crackle coating layer presents a color of the first primer layer.

7. The method of claim 1, wherein in the step (3), the transparent reaction-curable primer is selected from the group consisting of a transparent two-component polyurethane primer, a transparent one-component moisture-curable polyurethane primer, a transparent one-component alkyd primer, a transparent two-component epoxy primer and a combination thereof.

8. The method of claim 1, wherein in the step (5), the colorant comprises a yellow colorant.

9. The method of claim 8, wherein the yellow colorant is a yellow oily metal complex dye, a yellow iron oxide Anba glaze or a combination thereof.

10. The method of claim 1, wherein the polyurethane varnish comprises a two-component polyurethane varnish.

* * * * *